(12) United States Patent
Munige et al.

(10) Patent No.: US 12,032,203 B2
(45) Date of Patent: Jul. 9, 2024

(54) REDUCED DIAMETER OPTICAL FIBRE

(71) Applicant: Sterlite Technologies Limited, Gurgaon (IN)

(72) Inventors: Srinivas Munige, Aurangabad (IN); Milind Patil, Aurangabad (IN); Malleswararao Lanke, Aurangabad (IN); Anand Kumar Pandey, Aurangabad (IN); Anant Pawale, Gurugram (IN)

( * ) Notice: Subject to any disclaimer, the term of this patent is extended or adjusted under 35 U.S.C. 154(b) by 0 days.

(21) Appl. No.: 16/993,215

(22) Filed: Aug. 13, 2020

(65) Prior Publication Data

US 2021/0048579 A1 Feb. 18, 2021

(30) Foreign Application Priority Data

Aug. 13, 2019 (IN) .............................. 201911032716

(51) Int. Cl.
  *G02B 6/02* (2006.01)
(52) U.S. Cl.
  CPC ................................ *G02B 6/02395* (2013.01)
(58) Field of Classification Search
  CPC ............................... G02B 6/02395; G02B 6/02
  See application file for complete search history.

(56) References Cited

U.S. PATENT DOCUMENTS

| | | | | |
|---|---|---|---|---|
| 9,632,241 B2* | 4/2017 | Iwaguchi | ............... | C03C 13/045 |
| 2003/0118307 A1* | 6/2003 | Gruner-Nielsen | ........................... | |
| | | | | G02B 6/29377 |
| | | | | 385/127 |
| 2008/0013905 A1* | 1/2008 | Bookbinder | ....... | G02B 6/02342 |
| | | | | 385/124 |
| 2010/0003181 A1* | 1/2010 | Egami | ............... | H01L 21/02282 |
| | | | | 257/E21.271 |
| 2014/0056596 A1* | 2/2014 | Nakanishi | ............. | C03B 37/027 |
| | | | | 398/141 |
| 2014/0308015 A1* | 10/2014 | Bookbinder | ....... | G02B 6/03627 |
| | | | | 385/124 |
| 2015/0023642 A1* | 1/2015 | Bickham | ................. | C03C 13/04 |
| | | | | 385/124 |
| 2015/0055913 A1* | 2/2015 | Imoto | ...................... | G02B 6/40 |
| | | | | 385/24 |
| 2016/0362579 A1* | 12/2016 | Schmid | ................ | C08G 18/724 |
| 2017/0010411 A1* | 1/2017 | Li | ......................... | C03C 13/045 |
| 2017/0146732 A1* | 5/2017 | Botelho | ............ | G02B 6/02395 |

(Continued)

FOREIGN PATENT DOCUMENTS

CN      101840023 A  *  9/2010
WO    WO-2018020287 A1  *  2/2018

*Primary Examiner* — Jennifer Doan
(74) *Attorney, Agent, or Firm* — Steven R. Fairchild; Michael J. Pennington

(57) ABSTRACT

The present disclosure provides an optical fibre. The optical fibre includes a glass core, a glass cladding, a primary coating layer, and a secondary coating layer. The glass cladding surrounds the glass core. In addition, the primary coating layer sandwiched between the glass cladding and the secondary coating layer. Further, the secondary coating layer surrounds the primary coating layer. The primary coating layer has diameter of up to is in the range of 130 to 155 micrometers. Furthermore, the secondary coating layer has diameter in a range of about 160 micrometers to 180 micrometers. Moreover, diameter of the optical fibre is about 190 micrometers.

8 Claims, 1 Drawing Sheet

(56) References Cited

U.S. PATENT DOCUMENTS

2019/0127605 A1\* 5/2019 Homma ............... C08G 18/755
2019/0170934 A1\* 6/2019 Pastouret ........... G02B 6/03694
2021/0231896 A1\* 7/2021 Bickham ............ G02B 6/02395
2021/0294029 A1\* 9/2021 Bickham ............ G02B 6/02395

\* cited by examiner

100
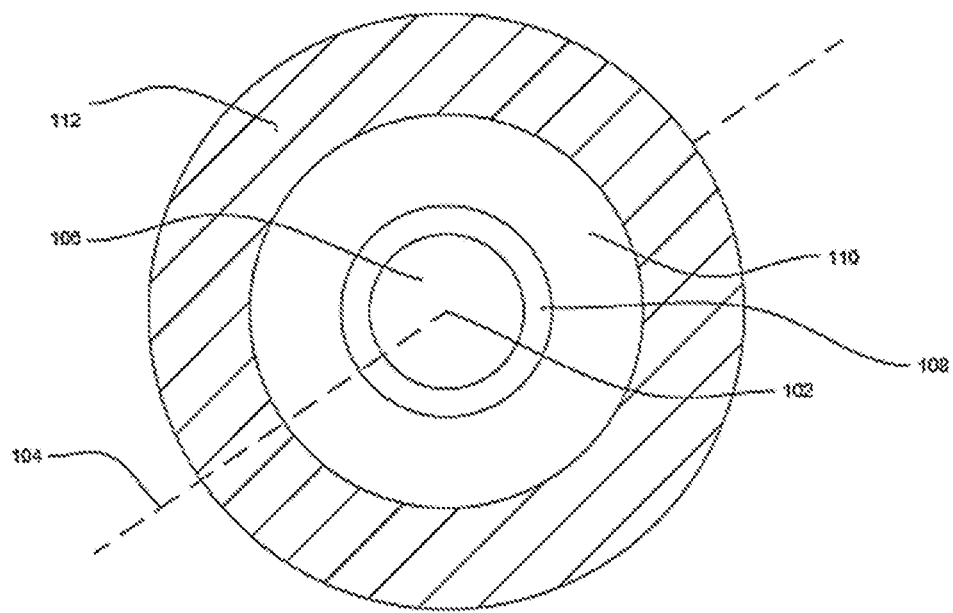

REDUCED DIAMETER OPTICAL FIBRE

BACKGROUND OF THE INVENTION

Field of the Invention

The present disclosure relates to a field of optical fibre. More particularly, the present disclosure relates to optical fibre with a reduced diameter. This application is based on, and claims priority from an Indian Application Number 201911032716 filed on 13 Aug. 2019.

Description of the Related Art

Optical fibres have acquired an increasingly important role in the field of communications. In general, optical fibre refers to a medium associated with transmission of information in the form of light pulses along a strand made of glass or plastic. In addition, the optical fibre consists of a core and a cladding. The cladding surrounds the core of the optical fibre and has relatively lower refractive index. Moreover, the core amplifies the optical signal and the cladding confines the optical signal inside the core of the optical fibre. A primary coating layer surrounds the cladding and has relatively low refractive index. A secondary coating layer surrounds the primary coating layer. Also, optical fibres having primary and secondary coatings are characterized by In-situ Modulus of coatings, coating geometry parameters like diameter of outer coating and Coat-Clad Concentricity error and non-circularity of coating (Coat ovality) For a reduced diameter fibre that is almost spliced with any type of fibre, the Coating geometry parameters are typically stringent than the values required by the international standards.

Also to make the optical fibre reduced in diameter and more universal, having more universal splicing capability with all category fibres, the optical fibres needs to evolved as fusion of multiple fibres or have the capability of all the fibres in one.

The significantly matured G652.D category fibres have already taken millions of kms in current FTTX infrastructure. The one advantage that G652D has, is its ultra-splicing capabilities but average macro-bending characteristics. To address the need to enhance the macro-bending, the G657A2 and G657A1 optical fibres have been developed and evolved. The replacement of G652.D fibres with G657.A2 or G657 A1 can be a solution however, G657.A2 or G657 A1 has their own issues when it comes to splicing capabilities. It is usually noticed that there is a persisting problem of using G.657.A2 fibres, because of OTDR artifacts that occur when splicing them to standard single mode fibres i.e. G.652D.

There is always a need to develop an optical fibre that is reduced in diameter and at the same time exhibits the property of both G657A2 and G657D so as to achieve flexible splicing capability as well as good macro bend performance i.e. easy splicing of G.657.A2/A1 with G.652.D.

There always seems to be a need to develop an optical fibre which would have an optimize design with good macro-bend characteristics, reduced diameter, as well as is also compliant to current network installed G.652.D. For example, G657A2 has a mode field diameter is the range as same as mode field diameter as that of G.652.D or the exactly same.

BRIEF SUMMARY OF THE INVENTION

In an aspect, the present disclosure provides an optical fibre. The optical fibre includes a glass core, a glass cladding, a primary coating layer and a secondary coating layer. The secondary coating layer has a secondary in-situ modulus greater than or equal to 1.14 giga pascal.

In an embodiment of the present disclosure, the optical fibre is compliant with G657.A2 bend-insensitive fibre that splices seamlessly with standard single mode fibres. Further, the optical fibre that is compliant with G657.A2 bend insensitive fibre, has an optimized design with the same mode field diameter as standard G.652.D fibres to ensure full compatibility with a G.652.D installed optical fibre base.

In an embodiment of the present disclosure, the optical fibre enables next-level cable designs and bend performance, while streamlining field optical time domain reflectometer (OTDR) testing protocols.

In an embodiment of the present disclosure, the optical fibre has extreme bend performance of a G.657A2 category optical fibre with the splicing convenience of a G.657.A1 design.

In an embodiment of the present disclosure, the optical fibre has a bend-insensitive property that assists in conserving optical power in closures and other locations where bending losses can quickly add up, further improving optical power margins.

In an embodiment of the present disclosure, the optical fibre further includes a primary coating layer sandwiched between the glass cladding and the secondary coating layer. The primary coating layer has one of a primary in-situ modulus is in the range of 0.3 to 0.6 mega pascal and a primary coating thickness in the range of 2.5 micrometers to 15 micrometers.

In an embodiment of the present disclosure, the secondary coating layer has a secondary coating thickness in the range of 2.5 to 25 micrometers.

In an embodiment of the present disclosure, the optical fibre has a diameter of 160 to 180 micrometers.

In another aspect, the present disclosure provides an optical fibre. The optical fibre includes a glass core, a glass cladding and a secondary coating layer. The secondary coating layer has a secondary coating thickness in the range of 2.5 to 25 micrometers.

In an embodiment of the present disclosure, the optical fibre further includes a primary coating layer sandwiched between the glass cladding and the secondary coating layer. The primary coating layer has at least one a primary coating thickness in the range of 2.5 micrometers to 15 micrometers and a primary in-situ modulus is in the range of 0.3 to 0.6 mega pascal.

In an embodiment of the present disclosure, the secondary coating layer has a secondary in-situ modulus greater than or equal to 1.14 giga pascal.

In an embodiment of the present disclosure, the optical fibre has a diameter of 160 to 180 micrometers.

In yet another aspect, the present disclosure provides an optical fibre. The optical fibre includes a glass core, a glass cladding and a coating over the glass cladding. The glass cladding surrounds the glass core. The glass cladding has a cladding refractive index. The coating has a coating refractive index. Absolute difference between the cladding refractive index and the coating refractive index is greater than 0.01.

In an embodiment of the present disclosure, the coating includes a primary coating layer and a secondary coating layer. The primary coating layer has one or more of a primary in-situ modulus in a range of 0.3 to 0.6 mega pascal and a primary coating thickness in a range of 2.5 micrometers to 15 micrometers. The secondary coating layer has one or more of a secondary in-situ modulus greater than or equal to 1.14 giga pascal and a secondary coating thickness in a range of 2.5 to 25 micrometers.

In an embodiment of the present disclosure, the primary coating layer has diameter of up to 130-155 micrometers. In addition, the secondary coating layer has diameter in a range of about 160 micrometers to 180 micrometers with a tolerance of ±5 micrometer.

In an embodiment of the present disclosure, the primary coating layer has in-situ modulus in range of 0.3 to 0.6 mega-Pascal. Further, the secondary coating layer has in-situ modulus of at least or more than 1.14 giga-pascal.

In an embodiment of the present disclosure, the reduced diameter optical fibre is achieved by modifying the coating die design. In an embodiment of the present disclosure, the optical fibre has reduced diameter, wherein reduction in overall diameter impacts the strength and durability of the optical fibre, wherein the strength and durability of the optical fibre with reduced diameter is maintained at desired strength and durability by having a secondary coating layer in-situ modulus of at least or more than 1.2 giga-pascal. In an embodiment of the present disclosure, the optical fibre 100 having in situ modulus of at least 1.2 or more make the optical fibre 100 to have reduced diameter, optimum coating characteristics, better striping capabilities, flexibility of splicing with other fibres and desired macro bend characteristics.

In an embodiment of the present disclosure, the reduced diameter optical fibre significantly increases the packing density of the optical fibre cables.

In an aspect, the present disclosure provides an optical fibre. The optical fibre includes a glass core, a glass cladding, a primary coating layer and a secondary coating layer. The glass core is an innermost portion of the optical fibre. The glass cladding surrounds the core. The primary coating layer surrounds the glass cladding. The primary coating layer is an inner coating layer. In an embodiment of the present disclosure, the primary coating layer helps in retaining optical properties of the optical fibre and of low in-situ modulus. The secondary coating layer surrounds the primary coating layer and provides strength and rigidity to the optical fibre and generally has high in-situ modulus than primary coating. The secondary coating layer prevents micro-bending losses in the optical fibre. The optical fibre is associated with one or more process control parameters. The one or more process control parameters include pressure control process parameters, concentricity control process parameters and the like.

In an embodiment of the present disclosure, the primary coating layer has diameter of up to 130-155 micrometers. In addition, the secondary coating layer has diameter in a range of about 160 micrometers to 180. micrometers.

In an embodiment of the present disclosure, the primary coating layer has in-situ modulus of about 0.25 mega-Pascal. Further, the secondary coating layer has in-situ modulus of about 1.2 giga-pascal or more.

In an embodiment of the present disclosure, the optical fibre has diameter of about 190 Micrometer.

In an another embodiment of the present disclosure, the optical fibre has maximum diameter of 195 micrometers.

In an embodiment of the present disclosure, the optical fibre has induced micro-bending loss of value up to 3 decibels per kilometer. The induced micro-bending loss is determined with the help of sand paper method.

In an embodiment of the present disclosure, quality of the optical fibre is achieved by controlling a pressure control process parameter. In addition, the pressure control process parameter has a pressure in a range of about 3 bar to 7 bar.

Further, pressure control process parameter is maintained for the primary coating layer and the secondary coating layer.

In an embodiment of the present disclosure, pressure control maintains a pressure difference between the primary coating layer and the secondary coating layer. The pressure difference associated between the primary coating layer and the secondary coating layer has value up to 2 bar. In addition, the pressure difference associated between the primary coating layer and the secondary coating layer provides high control over geometry of the optical fibre.

In an embodiment of the present disclosure, the quality of the optical fibre is achieved by controlling a coating concentricity control process parameter. In an embodiment of the present disclosure, the optical fibre is associated with coating concentricity control process parameter. In addition, the coating concentricity control process parameter controls the concentricity of coating on the optical fibre.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which:

FIG. 1 illustrates a cross sectional view of an optical fibre, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a cross-sectional view of an optical fibre 100, in accordance with various embodiments of the present disclosure. In general, optical fibre is a thin flexible fibre that is used for transmission of information as light pulses. In addition, the optical fibre 100 is used as a medium that carries light from one end to other end. In general, optical fibres are used in telecommunications to transmit telephone signals, internet communication, cable television signals and the like.

The optical fibre 100 is defined along a longitudinal axis 104 passing through a geometrical center 102 of the optical fibre 100. In general, longitudinal axis of the optical fibre is an imaginary axis along lengthwise direction of the optical fibre. The longitudinal axis 104 passes through the geometrical center 102. In an embodiment of the present disclosure, the geometrical center 102 of the optical fibre 100 is central point of the optical fibre 100. In other words, the geometrical center 102 of the optical fibre 100 is defined as midpoint of the diameter of the optical fibre 100. The optical fibre 100 is circular in shape. In an embodiment of the present disclosure, the optical fibre 100 may be of any shape. In an embodiment of the present disclosure, the optical fibre 100 is identical to G657A1 optical fibre. In another embodiment of the present disclosure, the optical fibre 100 is identical to G657A2 optical fibre. In yet another embodiment of the present disclosure, the optical fibre 100 is identical to G657B3 optical fibre.

In an embodiment of the present disclosure, the optical fibre 100 is manufactured by manufacturing a preform using various preform manufacturing techniques. The various preform manufacturing techniques includes but may not be limited to outside vapor deposition (OVD), Rod-in-Cylinder or Rod-in Tube, vapor axial deposition (VAD), PCVD and modified chemical vapor deposition (MCVD) or suitable combination of any of them.

In an embodiment of the present disclosure, the preform is manufactured using the outside vapor deposition. Generally, in the outside vapor deposition, a preform is made from ultra-pure vapors using a traversing burner and form fine soot particles of glass. The soot particles are deposited on surface of a rotating target rod. After the deposition of soot particles on the surface of the rotating target rod, the rotating target rod is removed and preform is manufactured.

In another embodiment of the present disclosure, the preform is manufactured using the outside vapor deposition. In general, the outside vapor deposition is used to manufacture a porous glass preform. In the outside vapor deposition process, the porous glass preform is fabricated by the deposition of fine soot particles onto the surface of a mandrel through flame hydrolysis. The starting material is deposited over a rotating mandrel and porous soot preform is grown on the mandrel. The starting material is volatile organic compound that includes but may not be limited to SiCl4, GeCl4 and O2. The porous soot preform is heated to create a transparent glass preform that further drawn into optical fibre.

Further, the optical fibre 100 is drawn from the preform. In an example, tip of the preform is lowered into a draw furnace. In addition, gasses are injected into the furnace to provide a clean atmosphere. Further, tightly controlled temperatures in the furnace soften the tip of the preform. Furthermore, the softening point of the preform tip is reached and gravity takes over and allows a molten gob to fall freely until stretched into a thin strand of the optical fibre 100.

The optical fibre 100 includes a glass core 106, a glass cladding 108, a primary coating layer 110, and a secondary coating layer 112. The center of the glass core 106 of the optical fibre 100 and the geometrical center 102 of the optical fibre 100 coincide with each other.

The glass core 106 is an innermost portion of the optical fibre 100. In general, glass core of the optical fibre facilitates propagation of light. In an embodiment of the present disclosure, the refractive index of the core 106 may be of any suitable value. In an embodiment of the present disclosure, the glass core 106 is associated with doped composition of GeO2 and chlorine. In an embodiment of the present disclosure, fluorination of the glass core 106 is performed.

The optical fibre 100 includes the glass cladding 108. The glass cladding 108 surrounds the glass core 106. In general, glass cladding has lower refractive index than glass core. The lower refractive index of the glass cladding 108 enables total internal reflection of light waves inside the glass core 106 and propagation of light waves within the glass core 106. In general, total internal reflection is a phenomenon that occurs when a propagated wave strikes a medium boundary at an angle larger than particular critical angle. The glass cladding 108 surrounds the glass core 106. In an embodiment of the present disclosure, refractive index of the cladding 108 may be of any suitable value—In another embodiment of the present disclosure, the glass cladding 108 may have any suitable composition. In yet another embodiment of the present disclosure, the glass cladding may be down doped or up-doped.

Further, the optical fibre 100 includes the primary coating layer 110. The primary coating layer 110 sandwiched between the glass cladding 108 and the secondary coating layer 112 of the optical fibre 100. The primary coating layer 110 is an inner coating layer. The primary coating 110 layer is by nature has relatively low modulus and hence protected by a relatively high modulus the secondary coating layer 112. The functions of primary coating 110 are to protect the glass core 106 and glass cladding 108, increase the mechanical strength, suppress ingression of moisture, reduce the micro bending loss (Soft/low modulus primary coating provides cushioning and reduce optical power loss due to the phenomenon of micro-bending) and provide the long term reliability. In an embodiment of the present disclosure, the primary coating layer 110 helps in retaining optical properties and of low in-situ modulus. The fraction of tensile load carried by a uniformly thick, linear elastic coating is generally given by:

$$(E_c * A_c)/(E_c * A_c + E_g * A_g)$$

where, E is the elastic modulus, A is the cross-sectional area, and subscripts g and c represent glass and coating respectively. The secondary coating layer surrounds the primary coating layer and provides strength and rigidity to the optical fibre as it is hard in nature and resists external impact on the optical fibre 100 and generally has high in-situ modulus than primary coating layer. In an embodiment of the present disclosure, the primary coating layer 110 has a diameter in a range of 130 to 155 micrometers. In another embodiment of the present disclosure, the diameter of the primary coating layer 110 may vary. In an embodiment of the present disclosure, the thickness of the primary coating layer 110 has a primary coating thickness is in the range of 2.5 to 15 micrometers. In an embodiment of the present disclosure, the primary coating thickness may vary.

In an embodiment of the present disclosure, the primary coating layer 110 has a primary in-situ modulus is in the range of 0.3 to 0.6 mega-pascal. In another embodiment of the present disclosure, primary in-situ modulus may vary.

The optical fibre 100 is associated with a microbending loss. The primary function of the coatings (primary coating layer 110) is to reduce the microbending loss. The microbending loss is determined by various methods and one of the method is sandpaper method. The optical fibre 100 is wind on a spool. In addition, the spool has diameter of about 140 millimeters. Further, the spool is associated with winding tension. In an embodiment of the present disclosure, winding tension has a value of about 250 grams. In another embodiment of the present disclosure, value of winding tension may vary. In an embodiment of the present disclosure, sandpaper is posted on surface of the spool. In addition, the sandpaper is posted using double sided tape. Further, the sandpaper method or test provides the microbending induced loss. Furthermore, the induced microbending loss has a value of up to 3 decibels per kilometer for the optical fibre 100. Furthermore, the optical fibre (100) has a mode field diameter is in the range of 8.2 micrometers to 9.7 micrometers at a wavelength of 1310 nanometers. The optical fibre has at least one of macro-bend loss up to 0.5 decibel per turn corresponding to wavelength of 1550 nanometer at bending radius of 7.5 millimeter. The optical fibre has a macro-bend loss up to 1.0 decibel per turn corresponding to wavelength of 1625 nanometer at bending radius of 7.5 millimeter.

In an embodiment of the present disclosure, the optical fibre 100 has at least one of a dispersion of up to 18 picosecond/(nanometer-kilometer) at wavelength of 1550 nanometer. In addition, the optical fibre 100 has a zero dispersion wavelength in range of about 1300 nanometer to 1324 nanometer. Further, the optical fibre 100 has a cable cut off wavelength of up to 1260 nanometer. Further the optical fibre 100 has a core clad concentricity error of upto 0.5. Further the optical fibre 100 has cladding non-circularity percentage of upto 0.7 percent. Further, the optical fibre 100 has a zero dispersion slope of upto 0.092 picosecond/(nanometer2·kilometer). In an embodiment of the present disclosure, the optical fibre 100 has a prof testing (kpsi) of at least 100 or more. Further, the optical fibre 100 has a coating strip force in between 1.3-5.0 Newton. Further, the optical fibre 100 has a fibre curl of at least 4 meters or more. Further the optical fibre 100 with in situ modulus of primary coating layer 110 is in the range of 0.3 to 0.6 mega-pascal and in-situ modulus of primary coating of secondary coating layer 112 is in the range of at least or more than 1.2 giga-pascal, wherein the coating in situ values creates a balance between to have the optical fibre 100, desired macrobend characteristics and optimum strip force characteristics and splicing characteristics with almost all the optical fibres.

The optical fibre 100 includes the secondary coating layer 112. The secondary coating layer 112 surrounds the primary coating layer 110. The secondary coating layer 112 is an outer coating layer. In an embodiment of the present disclosure, the secondary coating layer 112 may be made of any suitable material. The primary coating layer 110 and secondary coating layer 112, that concentrically covers the glass cladding 108 in the present disclosure referred as a coating (110, 112). The coating (110, 112) has a coating refractive index.

In an embodiment of the present disclosure, the secondary coating layer 112 has diameter of about 195 micrometers. In another embodiment of the present disclosure, the second coating layer 112 has diameter in a range of about 160-180 micrometers. In an another embodiment of the present invention, the overall diameter of the optical fibre (100) is upto 190 micrometers. In yet another embodiment of the present disclosure, the diameter of the secondary coating layer 112 may vary. Further, the secondary coating layer 112 has a secondary in-situ modulus is greater than or equal to 1.14 giga-pascal. In an embodiment of the present disclosure, the secondary in-situ modulus may vary. In an embodiment of the present disclosure, the secondary coating layer 112 has a secondary coating thickness is in the range of 2.5 to 25 micrometers. In an embodiment of the present disclosure, the secondary coating thickness may vary.

The application of the coating on the optical fibre 100 is associated with one or more control process parameters. The one or more control process parameters for the application of the primary and secondary coating on the optical fibre 100 include pressure control process parameters, coating concentricity control process parameters and the like. The control process parameters are set to achieve the optimum coating geometry parameters like diameter of the outer coating and mitigate the coating-cladding concentricity (coating concentricity control) and non-circularity of coating (coat ovality). In an embodiment of the present disclosure, for the application of the primary and secondary coating on the optical fibre 100 associated with pressure control process parameter has pressure maintained in a range of about 3 bar to 7 bar. In another embodiment of the present disclosure, range of pressure may vary. In addition, pressure control process parameter is maintained in the range of about 3 bar to 7 bar for the primary coating layer 110 and the secondary coating layer 112. In an embodiment of the present disclosure, pressure control process parameter maintains a pressure difference between the primary coating layer 110 and the secondary coating layer 112. The optical fibre 100 has a diameter less than 200 micrometers, preferably less than or equal to 195 micrometers is achieved with the pressure difference associated between the primary coating layer 110 and the secondary coating layer 112 has a maintained value of up to 2 bar. In another embodiment of the present disclosure, the pressure difference associated between the primary coating layer 110 and the secondary coating layer 112 may vary.

In an embodiment of the present disclosure, the optical fibre 100 is associated with coating concentricity control process parameter. The Process control process parameter for primary and secondary coating layer controls the diameter of the optical fibre 100 and optical fibre 100 may subject to uncontrolled coating concentricity. The coating concentricity control process parameter controls concentricity of coating on the optical fibre 100. Further, coating concentricity control process parameter manages refractive index of the primary coating layer 110. In addition, coating concentricity control process parameter manages refractive index of the secondary coating layer 112. In an embodiment of the present disclosure, the coating (110, 112) over the glass cladding (108), wherein the coating (110, 112) has a coating refractive index, wherein absolute difference between the cladding refractive index and the coating refractive index is greater than 0.01.

In an embodiment of the present disclosure, sufficient refractive index difference between the cladding 108 and the primary coating layer 110 generates diffraction pattern with high contrast patterns for concentricity monitors. The reference wavelength is about 633 nanometers.

The optical fibre 100 is characterized by a diameter. In an embodiment of the present disclosure, the optical fibre 100 has diameter of about 190 micrometers. In an another embodiment of the present disclosure, the optical fibre 100 has maximum diameter of about 195 micrometers. In another embodiment of the present disclosure, the diameter of the optical fibre 100 may vary. In an embodiment of the present disclosure, the optical fibre 100 belongs to ITU-T G657 category of fibres. However, the optical fibre 100 is not limited to the above mentioned category of fibres.

The foregoing descriptions of specified embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. An optical fibre comprising:
    a glass core;
    a glass cladding;
    a primary coating layer having a primary in-situ modulus in a range of 0.3 to 0.6 mega pascal, wherein the primary coating layer has a primary coating thickness in a range of 2.5 micrometers to 15 micrometers; and
    a secondary coating layer having a secondary in-situ modulus greater than or equal to 1.2 giga pascal, wherein the optical fibre has a diameter in a range of 160 to 195 micrometers.

2. The optical fibre as claimed in claim 1, wherein the primary coating layer is sandwiched between the glass cladding and the secondary coating layer.

3. The optical fibre as claimed in claim 1, Wherein the secondary coating layer has a secondary coating thickness in a range of 2.5 to 25 micrometers.

4. An optical fibre comprising:
    a glass core;
    a glass cladding;
    a primary coating layer having a primary in-situ modulus in a range of 0.3 to 0.6 mega pascal, wherein the primary coating layer has a primary coating thickness in a range of 2.5 micrometers to 15 micrometers; and
    a secondary coating layer having a secondary coating thickness in a range of 2.5 to 25 micrometers, wherein the optical fibre has a diameter in a range of 160 to 195 micrometers.

5. The optical fibre as claimed in claim 4, wherein the primary coating layer sandwiched between the glass cladding and the secondary coating layer.

6. The optical fibre as claimed in claim 4, wherein the secondary coating layer has a secondary in-situ modulus greater than or equal to 1.14 giga pascal.

7. An optical fibre comprising:
    a glass core;
    a glass cladding that surrounds the glass core has a cladding refractive index; and
    a coating over the glass cladding, wherein the coating has a coating refractive index, wherein absolute difference between the cladding refractive index and the coating refractive index is greater than 0.01, wherein the optical fibre has a diameter in a range of 160 to 195 micrometers, wherein the coating comprises a primary coating layer having a primary in-situ modulus greater than 0.3 mega pascal and lower than 0.5 mega pascal and a secondary coating layer having a secondary in-situ modulus greater than or equal to 1.2 gigapascal.

8. The optical fibre as claimed in claim 7, wherein the coating further comprising:
    the primary coating layer having a primary coating thickness in a range of 2.5 micrometers to 15 micrometers; and
    a secondary coating layer having one or more of a secondary in-situ modulus greater than or equal to 1.14 giga pascal and a secondary coating thickness in a range of 2.5 to 25 micrometers.

\* \* \* \* \*